United States Patent

[11] 3,586,860

| [72] | Inventors | Soren Borje Edhard Borjesson<br>Huskvarna;<br>Rolf Gosta Nyden, Bankeryd; Stig Arne<br>Ohlsson, Jonkoping, all of, Sweden |
|---|---|---|
| [21] | Appl. No. | 813,661 |
| [22] | Filed | Apr. 4, 1969 |
| [45] | Patented | June 22, 1971 |
| [73] | Assignee | Saab-Scania Aktiebolag<br>Linkoping, Sweden |
| [32] | Priority | Apr. 8, 1968 |
| [33] | | Sweden |
| [31] | | 4682/68 |

[54] X-RAY PLANT FOR BOTH RADIOSCOPY AND PHOTOGRAPHY
3 Claims, 2 Drawing Figs.

[52] U.S. Cl. .................................................. 250/95,
250/103, 250/207
[51] Int. Cl. ..................................................... G03b 41/16
[50] Field of Search .......................................... 250/95,
103, 207

[56] References Cited
UNITED STATES PATENTS

| 2,796,527 | 6/1957 | Oosterkamp et al. ......... | 250/95 |
| 2,913,585 | 11/1959 | Rodman ....................... | 250/207 |
| 2,962,594 | 11/1960 | Duffy .......................... | 250/95 |
| 3,109,093 | 10/1963 | Arrison et al. ................ | 250/95 X |
| 3,491,239 | 1/1970 | Dalman ....................... | 250/95 |

*Primary Examiner*—James W. Lawrence
*Assistant Examiner*—A. L. Birch
*Attorney*—Ira Milton Jones ABSTRACT: Plural transducer elements, comprising a single transducer, are associated with an X-ray tube to produce an output which varies with average intensity of X-ray radiation. The transducer element outputs are summed, averaged and amplified, and are corrected for factors common to both radioscopy and photography, then fed, through a selector switch, either to a dose velocity controlling device which maintains radiation intensity at a desired level for radioscopy, or to an exposure controlling device which times photographic exposures.

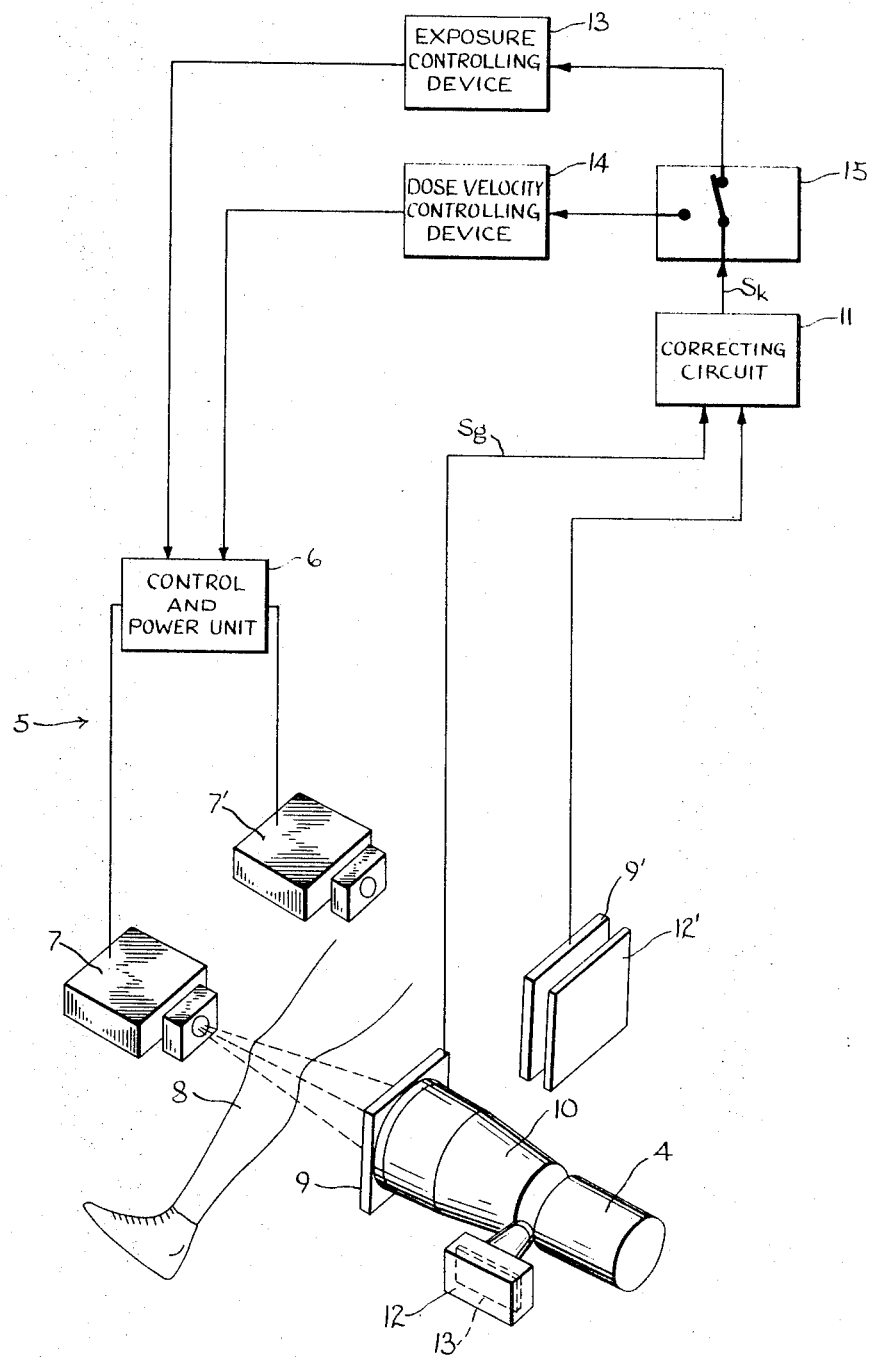

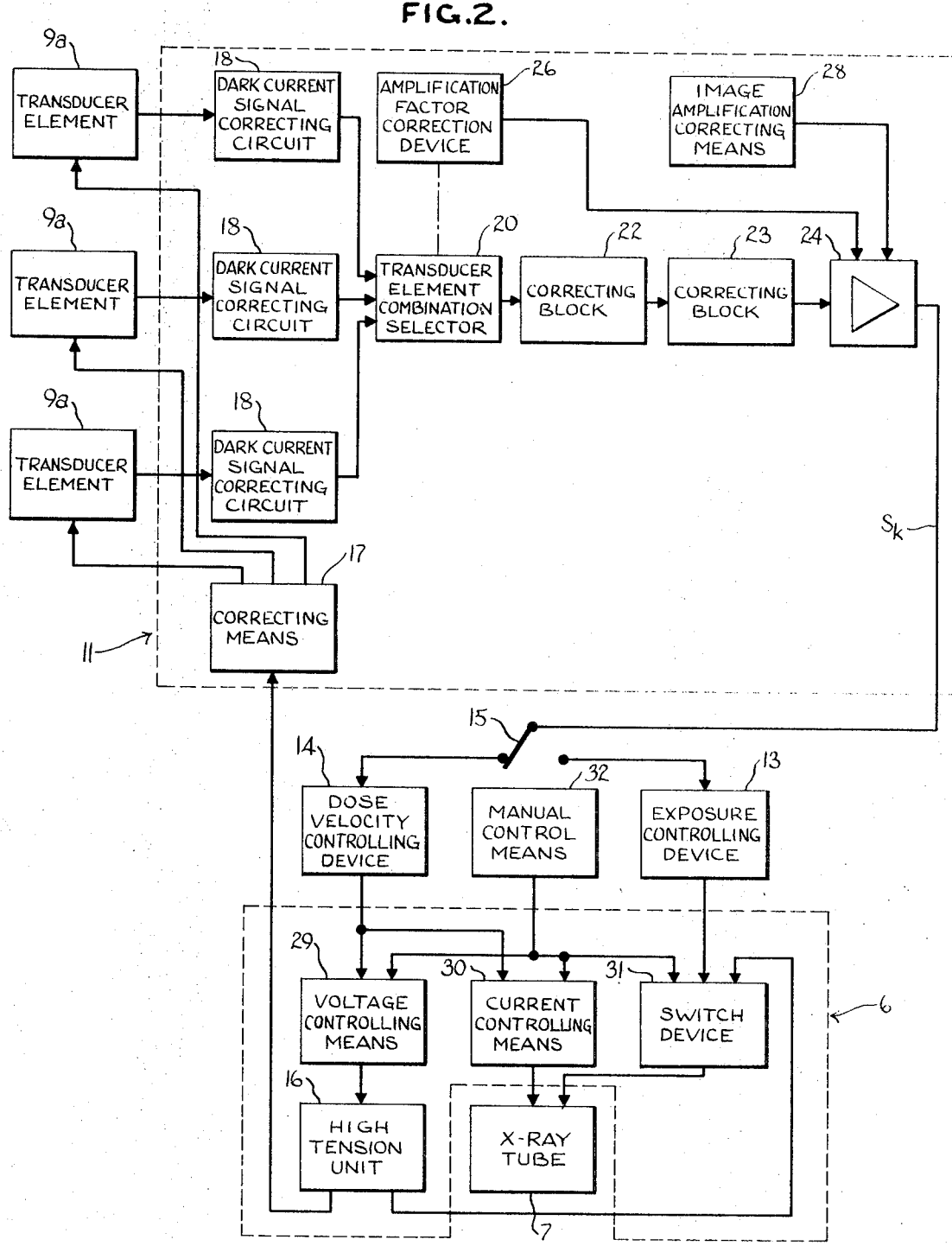

X-RAY PLANT FOR BOTH RADIOSCOPY AND PHOTOGRAPHY

This invention relates to X-ray examination plants, and more particularly to apparatus which adapts such a plant for both radioscopy and X-ray photography, providing for maintenance of a uniform intensity of radiation through the subject during radioscopy and for control of the duration of each period of radiation in photography.

An examination with the use of X-rays, particularly of a live subject, can be made either by means of radioscopy or by means of photography.

In radioscopy, radiation from an X-ray generator is continuously passed through the subject and onto a fluorescent screen or the like, whereby the X-ray radiation is converted to luminescence. The image may be viewed directly on the fluorescent screen (fluoroscopy), or may be viewed on the output screen of an image amplifier, or may be viewed indirectly with the use of television equipment (videoscopy); but in any case viewing of the image takes place concurrently with radiation.

In photography, the radiation passed through the subject is either imposed directly upon a film for large-image photography (also called radiography), or is imposed upon a fluorescent screen or the like which is in turn photographed by means of a still camera (fluorography) or a motion picture camera (kinofluorography), the image thus produced being viewed after radiation has terminated.

In X-ray radioscopy the intensity of radiation through the subject should be comparatively low and should be held as nearly constant as possible so that changes in the brightness of the image being observed do not cause distraction, confusion or error. In X-ray photography, radiation of a relatively high intensity is used, but the duration of each period of radiation is quite short and is preferably controlled automatically to cause a desired blackening of the film to be attained during the exposure interval.

It frequently happens that both modes of examination are needed for a living subject. After radioscopy is employed to locate the area to be particularly examined, X-ray photographs are made of that area and are subsequently used for more thorough and intensive study and are kept for purposes of reference.

Heretofore separate X-ray plants have often been used for radioscopy and photography, each substantially complete for its particular mode of examination. This not only entailed a duplication of the rather expensive X-ray generators and associated equipment, and occupied valuable floor space, but more important it involved a great deal of inconvenience and delay that was detrimental to operating personnel as well as to patients, due to shifting from use of one equipment to another in the course of an examination and making the necessary adjustments to each as it was brought into use.

In some types of equipment separate transducers were used for controlling radiation from the generator in accordance with the type of examination to be conducted, and there could be as many as four different transducers or transducer combinations, to accommodate fluoroscopy, videofluoroscopy, radiography and fluorography-kinofluorography. Again, the use of different transducers complicated and prolonged examination procedures and created service and adjustment problems.

By contrast, it is an object of this invention to provide control means for an X-ray plant that adapts it for both radioscopy and X-ray photography, and whereby the plant can be very quickly converted from one mode of examination to another without the need for making numerous settings and adjustments in effecting such conversion.

It is also an object of this invention to provide an X-ray plant having a single transducer that can serve for all modes of X-ray examination.

Another object of this invention is to improve the utility and versatility of X-ray apparatus by providing control means for an X-ray plant that adapts it for each of the modes of X-ray examination and provides for corrections in the output of its transducer whereby a single transducer can be used for all modes of examination without duplication of the means for effecting such corrections.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate one complete example of the physical embodiment of the invention constructed according to the best mode so far devised for the practical application of the principles thereof, and in which:

FIG. 1 is in part a general block diagram and in part a schematic perspective view of an X-ray plant embodying the principles of this invention; and FIG. 2 is a block diagram of control apparatus embodying the principles of the invention.

Referring now more particularly to the accompanying drawings, the numeral 5 designates generally an X-ray generator for producing radiation that can be used in both radioscopy and X-ray photography, comprising, in general, a control and power unit 6 and an X-ray tube 7. The control and power unit 6 can be governed either automatically or manually, and its function is to start and stop energization of the X-ray tube 7 and to control the kV-number (voltage across the tube) and the mA-number (emission current in the tube). In general, the kV-number selected determines the contrastiness of the image, while the mA-number determines the brightness of the image in radioscopy and, in X-ray photography, determines the total blackening of the film for a given exposure interval.

In the path of radiation that has passed through a subject 8 from the X-ray tube 7 there is located a transducer 9 that comprises (as indicated in FIG. 2) a plurality of transducer elements 9a.

Each transducer element can be, for example, an ionization chamber that responds directly to X-ray radiation, or (as preferred) a photoelectric cell that responds to luminescence of a fluoroscopic screen or of an image amplifier, such luminescence in either case being variable with the intensity of the radiation. Whether directly or indirectly responsive to X-rays, each transducer element responds to a portion of the total radiation that has passed through the subject, and the transducer as a whole produces a continuous output signal $S_u$ that has a magnitude which is a function of total radiation.

In the illustrated arrangement, there is located behind the transducer 9, in the path of the X-rays that have passed through the subject, an image amplifier 10 which converts the X-ray radiation to visible light and amplifies such light to allow it to be directly viewed on an output screen of the image amplifier. By means of a television camera 4 the visible image can also be reproduced on a remotely located television monitor (not shown), or it can be photographed by means of a camera 12 loaded with a suitable film 13.

If desired, at least one additional X-ray tube 7' can be connectable with the control and power unit 6, so that the unit 6 can be used for energizing any one of such tubes, it being understood that there will be suitable selector switch means (not shown) for alternatively connecting the tubes with the power unit. The provision of a plurality of tubes enables different parts of the subject to be examined in rapid succession, with a minimum of effort and inconvenience. The tube 7' is shown as having associated with it a sensitized plate 12' for large-image X-ray photography, as a further illustration of the adaptability of the apparatus to various modes of examination. Also associated with the X-ray tube 7' is a transducer 9' that produces an output having a magnitude which is a function of the intensity of radiation from said tube.

The radiation intensity signal $S_a$ from whichever of the transducers 9 or 9' is in operation is fed into a correction unit which is described in detail hereinafter and which is generally designated by 11. Here the signal $S_a$ is corrected and compensated for certain factors that must be taken into account for both radioscopy and photography, and the so-modified signal, which is designated $S_k$, goes to a selector switch 15 through which it is fed either to an exposure controlling device 13 or to a dose velocity controlling device 14, depending upon whether the apparatus is being used for X-ray photography or for radioscopy, the switch 15 being positioned according to the mode of examination.

The exposure controlling device 13 automatically times the duration of radiation, shutting off the power to the X-ray tube at such time as to terminate radiation when the film has been subjected to exactly the desired quanta of radiation. For a detailed description of one form of exposure controlling device, incorporating improvements which are particularly valuable in apparatus embodying the present invention, reference may be made to the copending application of Stig Arne Ohlsson, Ser. No. 812,101, filed Apr. 1, 1969.

The dose velocity controlling device 14 automatically controls the intensity of radiation to maintain the magnitude of the signal $S_a$ at a constant predetermined value, thereby insuring that the luminosity of the image being observed will remain at a desired level.

The correction unit 11 corrects or compensates for: dark current of the transducer, the diaphragm of the pencil of X-rays, the response curves of the transducer (and of the image amplifier if it cooperates with the transducer) with variations in hardness of the radiation, and the number of transducer elements that are in operation; and it also modifies the transducer output signal to compensate for picture ratio (size of the image in proportion to film size) and for the degree of amplification of the image amplifier if it cooperates with the transducer.

As best seen from FIG. 2, which illustrates in more detail the part of the plant that is associated with the X-ray tube 7, each transducer element 9a is energized from a high tension unit 16 that also energizes the X-ray tube. The connection of each transducer element with the high tension unit is through a correcting means 17, which effects a compensation for dependence of the transducer elements and the image amplifier upon the hardness of the X-ray radiation.

For each transducer element there is a dark current signal correcting circuit 18 to which the transducer element is connected and to which its output is fed. Each circuit 18 modifies the output of its transducer element to correct for the dark current thereof.

If only one transducer element were used, there would be no assurance that its output would represent the actual average radiation that has passed through the subject being examined. It is for this reason that several transducer elements are used, and their number and location with respect to the whole zone of radiation are determined by experience, with a view to insuring that those transducer elements which are active at any time will cooperate to produce a total output that is accurately representative of the average radiation through the subject.

The dark current signal correcting circuits 18 are all connected with a transducer element combination selector 20 which combines the outputs of the several active transducer elements and issues a summation signal that corresponds to their combined outputs. This summation signal is fed, through first and second correcting blocks 22 and 23, into a differential amplifier 24, the output of which is available to either the dose velocity controlling device 14 or the exposure controlling device 13, depending upon the positioning of the selector switch 15.

The first correcting block 22 corrects the summation signal for the action of the diaphragm of the pencil of X-rays. The second correcting block 23 further modifies the summation signal to adapt it for the type of control for which it is intended to be used, correcting it to compensate for picture ratio and the sensitivity of the particular film being used.

An amplification factor correction device 26, having a mechanical connection with the transducer element combination selector 20 and also having a connection with the differential amplifier 24, adjusts the amplification factor of said amplifier in accordance with the number of transducer elements that are active, so that the output from the amplifier will correspond to the average of the transducer element outputs. Thus if two transducer elements are active, the correction device 26 causes the amplifier to have an amplification factor that is half of what it would be if only one were active.

A further correction of the amplification factor of the differential amplifier 24 is made by means of an image amplifier correcting means 28 connected therewith, by which a correction can be made to the differential amplifier output signal in accordance with the degree of amplification of the image amplifier.

The corrections are made in the dark current signal correcting circuits 18 and in the correcting blocks 22 and 23 by properly adjusted resistance means in those elements, or by arranging them, in a manner that will be apparent to those skilled in the art, to cooperate with the differential amplifier 24 to effect appropriate modification of its amplification factor and/or with the high tension unit 16 to modify its output to the transducer elements.

The control and power unit 6 comprises a voltage controlling means 29 that is connected with the high tension unit 16, a current controlling means 30, and a switch device 31. The voltage controlling means 29 and the current controlling means 30 are adjustable by means of suitable manual control means, as indicated at 32, so that the high tension unit can be caused to maintain a desired kV-number across the X-ray tube 7 irrespective of variations in line voltage, and so that the current controlling means is caused to maintain the desired mA-number.

The switch device 31 can be an electromechanical contactor which terminates radiation by breaking the high voltage across the X-ray tube, or it can be of some other type suitable for use with more recent X-ray equipment wherein radiation is started and stopped by means of a control grid in the X-ray tube. The manual control means 32 includes provision for manual actuation of the switch device 31, particularly for radioscopy. However, when the selector switch 15 is positioned for photography, the exposure controlling device 13 actuates the switch device 31 and controls the period during which radiation is generated for each exposure to insure that the desired blackening of the film will be obtained.

With the selector switch 15 in its radioscopy position, in which it is shown, the output of the differential amplifier 24 is fed to the dose velocity controlling device 14, which so controls the voltage controlling means 29 and the current controlling means 30 as to maintain a constant value of the output of the differential amplifier, which is to say a constant average intensity of radiation through the subject.

It will be understood that all of the manual controls for the apparatus will normally be located on a single readily accessible control panel.

In using the apparatus of this invention, the X-ray technician first adjusts the positions of the several transducer elements 9a so that the location of the elements need not be changed upon switch-over from radioscopy to photography. Such adjustment is made on the basis of experience. The technician also makes the appropriate adjustments on the amplification factor correction device 26, on the correcting blocks 22 and 23, and on the image amplification correcting means 28. The technician can then switch on the X-ray radiation for radioscopy, and the examining doctor can view the radioscopy image. The luminescence of the image is held constant by the dose velocity controlling device 14 at a value which the doctor can vary at will during the examination.

When the doctor finds an area that he desires to photograph, he pushes an exposure button which actuates the selector switch 15, and the apparatus is converted to its photography mode, producing a suitable radiation for the exposure under the control of the voltage controlling means 29 and the current controlling means 30 while the exposure controlling device 13 automatically times the duration of the exposure. At the end of the exposure interval, the X-ray apparatus is automatically reconverted to its radioscopy mode so that the radioscopic image can again be viewed.

From the foregoing description taken with the accompanying drawings it will be apparent that this invention provides apparatus which automatically adapts an X-ray plant for both radioscopy and X-ray photography, allowing the plant to be quickly and easily converted from one to another of such examination modes, and that the apparatus of this invention permits a single transducer to be used in controlling the X-ray generator for both radioscopy and photography.

What we claim as our invention is:

1. In an X-ray examination plant having an X-ray generator, means for controlling the generator by reference to the output from a transducer, which output has a magnitude that is a function of the intensity of radiation from the generator that has passed a subject being examined, said control means being characterized by:
   A. signal correction means connected with the transducer for modifying the output thereof in accordance with characteristics of the generator-transducer combination that must be taken into account in controlling the generator for both radioscopy and photography;
   B. selector switch means connected with the signal correction means and alternatively movable to each of two positions;
   C. exposure duration control means connected with the selector switch means to be connectable therethrough, in one of its said positions, with the signal correction means, for timing operation of the generator in photography in accordance with said magnitude of the transducer output; and
   D. radiation intensity control means connected with the selector switch means to be connectable therethrough, in the other of its said positions, with the signal correction means, for so controlling the generator for radioscopy as to maintain said magnitude of the transducer output substantially constant.

2. The X-ray plant of claim 1, further characterized by:
   said signal correcting means being arranged to correct for dark current of the transducer.

3. The X-ray plant of claim 1 wherein the transducer comprises a plurality of transducer elements, each responsive to a different portion of the radiation from the generator that has passed a subject being examined, further characterized by said signal correcting means comprising:
   A. a plurality of dark current correction means, one connected with each transducer element for correcting the output therefrom to compensate for the dark current thereof;
   B. summation means connected with all of said dark current correction means to combine the corrected outputs of the several transducer elements;
   C. amplifier means having its input connected with the output of said summation means and having a controllable amplification factor; and
   D. control means connected with the several transducer elements and with the amplifier means for simultaneously controlling the number of transducer elements in operation and the amplification factor of the amplifier so that the output of the amplifier is a function of the average of the corrected outputs of the transducer elements in operation.